United States Patent Office 3,152,475
Patented Oct. 13, 1964

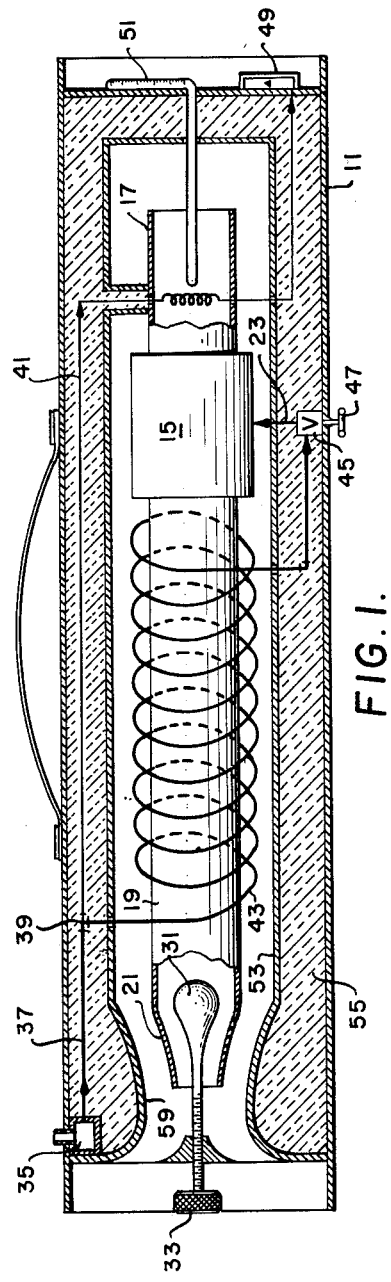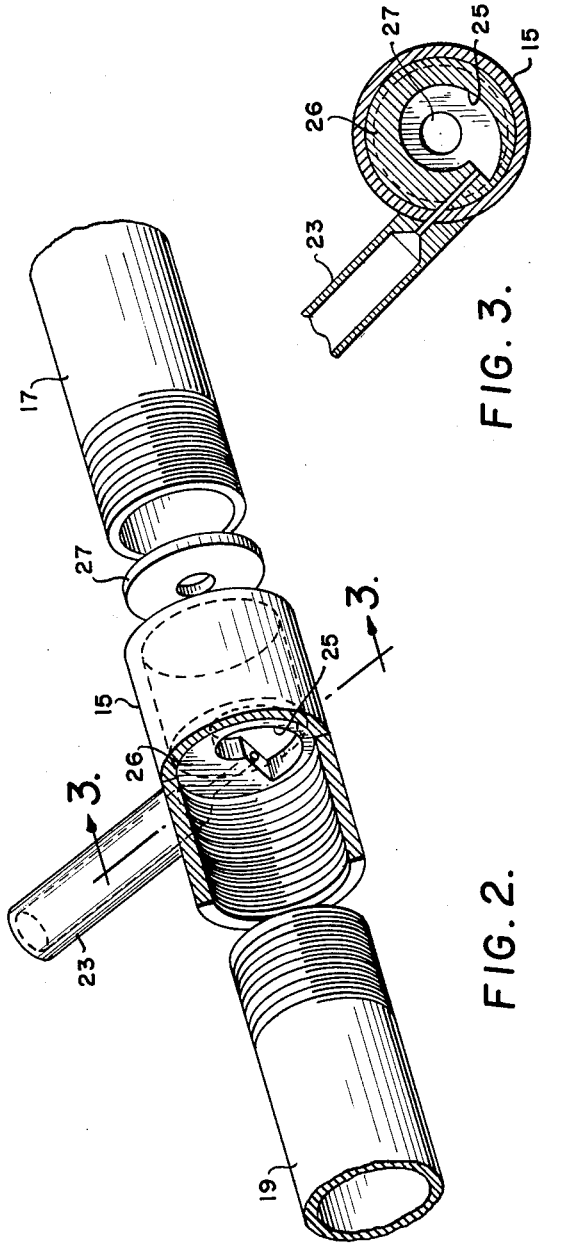
FIG. 1.
FIG. 2.
FIG. 3.
INVENTORS
STEPHEN H. FORD, JR.
JOHN W. CADORETTE
BY Howard W. Hermann
AGENT.

3,152,475
HIGH PRESSURE GAS MOISTURE INDICATOR
Stephen H. Ford, Jr., Annapolis, and John W. Cadorette, Arnold, Md., assignors to the United States of America as represented by the Secretary of the Navy
Filed June 14, 1962, Ser. No. 202,633
7 Claims. (Cl. 73—335)
(Granted under Title 35, U.S. Code (1952), sec. 266)

The invention described herein may be manufactured and used by or for the Government of the United States of America for governmental purposes without the payment of any royalties there on or therefor.

This invention relates to instruments for indicating the moisture content of gases and, more particularly, to instruments for indicating the moisture content and/or the dew point of gases under high pressure.

Heretofore various devices have been suggested and used to measure the water content of the dew point of gases. None, however, was completely satisfactory, particularly when it became necessary to determine dew point of gases at relatively high pressure, or determining whether such gases were of adequate dryness for a particular purpose.

Most of the prior art devices for such purposes required an additional source of energy in addition to the compressed gas being sampled, in order to reach the neccessary temperatures for determining the dew point. Further the prior art devices were relatively expensive, required calibration, and were complicated to operate and read. It was also found that when very dry gases were to be checked, prior art devices were virtually impossible to read.

The present invention is a moisture indicating device which may be used either as a simple preset indicator for indicating on a go-no-go basis whether gas is of sufficient dryness for a predetermined purpose, or alternatively as a dew point indicator for gases, and is capable of accurate use even with extremely dry gases. The device requires no other energy source other than the pressure of the gas it is measuring and can be safely constructed so that it has no upper limit on the pressure of the gas that may be checked for moisture content by the device.

The device of this invention makes use of a vortex tube, or Hilsch tube, in combination with a regenerative heat exchanger and a sampling heat exchanger as its basic elements. The principles of the vortex tube are described in the November 1958, Scientific American at pages 145 and 146.

The vortex tube of the present invention supplies chilled gas to a regenerative heat exchanger which enables the vortex tube in turn to quickly produce gas of very low temperature. The sampling heat exchanger utilizes high pressure capillary type tubing which discharges into a telltale which in turn indicates whether sample gas is flowing through the tubing or has stopped flowing due to freezing. A thermometer indicates the temperature at which freezing occurs. The device is simple, relatively inexpensive, and requires no complicated operation or calibration to give an accurate indication.

Accordingly, it is an object of this invention to provide a simple, inexpensive moisture indicator for assuring that pressurized gas is sufficiently low in moisture content for any specified purpose.

A further object is to provide a moisture indicator for indicating moisture content of gases without the necessity of an external energy source.

Another object is the provision of a moisture indicator for indicating the moisture content of pressurized gases substantially without limitation as to the maximum pressure under which the indicator will function.

Still another object is to provide for measurement of the actual dew point of a gas at pressure without the need of a calibration curve to interpret measurement.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

FIG. 1 is a partly diagrammatic view in cross-section of an embodiment of a moisture indicator made in accordance with the principles of the present invention;

FIG. 2 is a cutaway view partially in longitudinal cross-section of the vortex tube portion of the embodiment shown in FIG. 1;

FIG. 3 is a cross-sectional view of the vortex tube portion of the embodiment of FIG. 1, taken on line 3—3 of FIG. 2 and looking in the direction of the arrows.

Referring now to the drawings, wherein like reference numerals designate like or corresponding parts throughout the several views, there is shown in FIG. 1 an instrument housing or casing 11, which may be made of a rigid material such as steel, or the like, and is preferably rectangular in shape and has a carrying handle 12 at the top thereof. One end is closed and the other end provides for exhaust as will be explained hereinafter.

Mounted centrally within the casing 11 is a vortex tube, or Hilsch tube, 15 from which extend a pair of diametrically opposed longitudinal tubes comprising a cold tube 17, and a hot tube 19 which has a necked portion 21 at its outermost end.

FIGS. 2 and 3 show the vortex tube construction in greater detail. The device is a T-shaped assembly having an input leg 23 adapted to be connected at its outer end to a gas supply and having its inner end constricted but open to a spiral chamber 25 formed by an insert 26 in the T-junction. Adjacent the spiral chamber 25 on the cold arm of the T is a washer 27 which allows gas to pass into the cold tube 17 only from the center of the spiral chamber.

The washer 27 is held in place in contact with the insert forming the spiral chamber by the end of the cold pipe which may be threaded into female portion at the end of the vortex tube body 15.

The principles of the vortex tube are discussed in some detail in the aforementioned article in the Scientific American magazine, but, as stated therein, are not completely understood. It is known, however, that when high pressure gas is introduced into the spiral chamber 25 through leg 23, tube 17 emits cold gas, while hot gas comes out of the tube 19.

In accordance with one commonly accepted theory the compressed gas entering the spiral chamber is guided around the spiral wall of the chamber and forms a high velocity vortex. Molecules moving around the outside of the vortex are slowed by friction with the spiral wall and because of centrifugal force tend to fall toward the center of the vortex. The fast moving particles inside the outer layer of the vortex transfer some of their energy to the molecules falling from the layers by bombardment. The net result is an accumulation of slow moving, low energy molecules in the center of the vortex, and high energy, fast moving molecules near the outside. In terms of thermodynamics, the high velocity and high energy molecules are hot and the low energy, low velocity molecules are cold. The vortex thus becomes a mass of cold gas surrounded by a rim of hot gas.

The pressure of the input gas forces the gas from the spiral chamber. Washer 27 allows gas to pass out of the chamber only at its center. Since the gas at the center of the chamber is cold, the arm adjacent to the washer becomes the cold leg of the tube. Conversely, the valve plug 31 blocks the center but allows the rim of hot gas to escape through the eductor at the end of the hot leg of the tube.

The temperature in the cold leg is decreased still further by the expansion of the compressed gas as it passes through the hole in the washer 27 into the cold tube 17 which is of relatively large diameter as compared to the diameter of the hole. In order to maintain a pressure within the spiral tube and to provide for adjustment of the temperature at the cold end, the outermost end 21 (FIG. 1) of the hot tube 19 is of reduced diameter, and a valve 31 which may be adjusted by means of a thumbscrew 33, or the like, is provided for further restricting the size of the opening of the hot tube to the atmosphere.

Referring further to FIG. 1, the gas which is to be tested enters the instrument at a coupling 35, and passes through a line 37 to a T junction 39 where a sample flow portion is bled off through a capillary tube 41, the remainder of the gas being passed on to a regenerative heat exchange means shown as a coil 43 which surrounds the hot pipe 19 of the vortex tube. In the regenerative heat exchanger, the incoming gas is precooled by cold gas moving from the cold pipe 17 toward the vent in the end of the instrument casing.

The precooled gas after leaving the regenerative heat exchange means is carried to a throttling device, shown as a valve 45, connected to the leg 23 of the vortex tube 15. The throttling device 45 may be adjusted by means of a knob 47 to regulate the flow of gas into the vortex tube and thereby allow further adjustment of the temperatures produced in the cold pipe 17.

The sample flow capillary tube 41 carries a sample of the gas to the cold end of the vortex tube through the sampling heat exchanger in the cold end of the tube wherein it is cooled to the temperature of gas leaving cold pipe 17, and then to a tell-tale or flow indicator 49 outside the casing 11. When the temperature in the sampling heat exchanger is sufficiently low to reach the dew point of the gas being tested the moisture immediately freezes thereby stopping the flow through the capillary tubing of the sampling heat exchanger. This is indicated by the tell-tale, or flow indicator, 49 which may comprise, for example, a vane biased in one position but being pushed to another position whenever gas is flowing out of the capillary tube. A thermometer 51 is mounted in the end of the cold pipe 17, so that the temperature of the gas at that point may be read.

The vortex tube and regenerative heat exchange elements are encased in an inner shell 53 again of steel or the like which is surrounded by a layer of heat insulation 55 held in place by outer shell 11. The inner shell 53 has a necked portion 59 at the end of the outer casing, or housing 11. Spacing is provided between the vortex tube 15 and its associated hot and cold pipes, and the inner shell 53 ot allow gas flowing from the open end of the cold pipe 17 to travel the length of the vortex tube and through the regenerative heat exchanger 43 toward the open end portion 59 of the inner shell 53. The inner shell 53 completely encloses the vortex tube and the regenerative heat exchanger except for the opening provided in the tapered or necked portion 59.

The tapered or necked portion 59 of the shell 53 in conjunction with the tapered or necked portion 21 of the hot pipe 19 and the warm air exhausted from the pipe 19 forms an eductor which lowers the pressure at the cold end of the tube. It was found in tests of an embodiment of this invention that an additional temperature drop of 20 degrees Fahrenheit was provided at the cold pipe by utilization of this vacuum effect as compared to discharge to open air.

In operation, as a go-no-go indicator on a Navy air dryer, the operator connects the instrument via a flexible hose to a sampling valve provided on the Navy high pressure air dryers. The hose is connected to the instrument by means of the coupling 35. The throttling valve 45 is adjusted by means of the handle 47 to give the temperature at which the dew point is to be checked. This temperature is read on the thermometer 51. If the desired temperature cannot be reached by adjustment of the throttling valve 45, adjustment of the hot pipe valve 31 by means of its thumbscrew 33 may also be required. In most Navy dryers dew point is checked at minus 62 degrees Fahrenheit.

When the desired temperature is reached, the operator checks the tell-tale indicator 49 to see if air is still flowing through the sampling capillary tube 41. If air continues to flow from the sampling tube after several minutes, the operator is assured that the air from the dryer is of, or drier than, the required dryness. Conversely, if air from the sampling tube stops flowing, the operator knows that the tube is clogged with frost, indicating that the air coming out of the dryer is wetter than the requirements since its dew point is above minus 62° F. Ths indicates the dryer is malfunctioning and requires servicing.

If the operator wishes to measure the actual dew point of a gas rather than use the instrument simply as a go-no-go indicator as above, the instrument may be set for an assumed dew point, −60° F. for example. If gas continues to flow through the sampling tube, the operator knows that the gas is drier than his assumed dew point. He chooses another temperature which is somewhat lower, −80° F. for example. If the flow stops he knows that the gas is wetter than the assumed dew point and that the actual dew point is somewhere between −60° F. and −80° F. By continuous boxing in of the sample, the actual dew point can be measured within the accuracy of the thermometer calibration. For most purposes, measurement within two degrees Fahrenheit is sufficiently accurate. It will be realized, however, that if the thermometer is sufficiently accurate, measurements which are accurate within fractions of a degree may be made.

It will be realized that the embodiment of the invention which has been described may be altered to some extent without departing from the spirit of the invention. For example, a conventional dew cup may be used in place of the sampling capillary tube for measuring the dew point of pressurized air. With such an arrangement, the vortex tube and the regenerative heat exchanger provide the dew cup with coolant to replace the pressurized carbon dioxide which is conventionally used as a dew cup coolant. Chilled air is considered superior to carbon dioxide because air will not clog the cooling chamber of a dew cup at extremely low temperatures as carbon dioxide does. Further, there is no necessity for carrying carbon dioxide bottles; a source of coolant is provided by the pressurized air which is to be checked for dryness.

The instrument, by design of the wall and tube thickness is practically unlimited as to maximum pressures at which it may be accurately utilized; the cost of providing an instrument for checking gases at pressures of even 100,000 p.s.i. is quite small. The instrument is easily set up, easily adjusted, and easily read. It is rugged, but of low cost.

Obviously, many other modifications and variations of the present invention are possible in the light of the above teachings. It is, therefore, to be understood that, within the scope of the appended claims, the invention may be practiced otherwise than as specifically described.

What is claimed as:

1. An instrument for indicating the moisture content of pressurized gas comprising:
   (a) an instrument casing having at least one vent therein;
   (b) a vortex tube mounted within said casing, said vortex tube having a hot end and a cold end while in operation;
   (c) said hot end of said vortex tube having a reduced diameter at its outermost portion;

(d) an inner shell mounted within said casing and surrounding said vortex tube, said inner shell being sealed except for the end adjacent the hot end of said vortex tube;

(e) the end of said inner shell which is adjacent the hot end of said vortex tube also having a reduced diameter whereby an eductor is formed by the respective reduced diameter ends of said vortex tube and said inner shell;

(f) means for supplying a flow of said pressurized gas operatively into said vortex tube; and (g) means for introducing a sample of said pressurized gas into the vicinity of the cold end of said vortex tube whereby said sample is cooled thereby.

2. An instrument as defined in claim 1 but further including:

(a) valve means in said outermost portion of said vortex tube for controlling the efflux of gas therefrom.

3. An instrument as defined in claim 2 wherein:

(a) said means for supplying a flow of said pressurized gas into said vortex tube includes an adjustable throttling valve for regulating the flow of said gas entering said vortex tube.

4. An instrument as defined in claim 3 wherein:

(a) said means for supplying a flow of said pressurized gas into said vortex tube further includes means for precooling said gas before it enters the vortex tube.

5. An instrument as defined in claim 4 wherein:

(a) said means for introducing a sample of said pressurized gas into the vicinity of said vortex tube include a tube having a small bore passing into the cold end of said vortex tube.

6. An instrument as defined in claim 5 wherein said means for precooling said gas includes a coil of tubing through which said gas passes before reaching said vortex tube, said coil being positioned between said vortex tube and said inner shell whereby the gas moving from the cold end of said vortex tube to said eductor passes over said coil of tubing.

7. An instrument as defined in claim 5 but further including:

(a) temperature indicating means for indicating the temperature of the cold end of the vortex tube; and (b) means for indicating whether gas is flowing through said small bore tube.

References Cited in the file of this patent

UNITED STATES PATENTS

| | | |
|---|---|---|
| 2,541,512 | Hahn | Feb. 13, 1951 |
| 2,641,928 | Howell | June 16, 1953 |
| 2,763,150 | O'Bannon | Sept. 18, 1956 |
| 2,829,363 | Obermaier et al. | Apr. 1, 1958 |
| 2,904,995 | Obermaier | Sept. 22, 1959 |
| 3,050,982 | Vollmer et al. | Aug. 28, 1962 |